United States Patent
Desai et al.

(10) Patent No.: US 10,264,564 B2
(45) Date of Patent: Apr. 16, 2019

(54) SYSTEM AND METHOD FOR RESOURCE ALLOCATION FOR MASSIVE CARRIER AGGREGATION

(71) Applicant: Futurewei Technologies, Inc., Plano, TX (US)

(72) Inventors: Vipul Desai, Palatine, IL (US); Brian Classon, Palatine, IL (US); Philippe Sartori, Plainfield, IL (US)

(73) Assignee: Futurewei Technologies, Inc., Plano, TX (US)

( * ) Notice: Subject to any disclaimer, the term of this patent is extended or adjusted under 35 U.S.C. 154(b) by 40 days.

(21) Appl. No.: 15/009,615

(22) Filed: Jan. 28, 2016

(65) Prior Publication Data

US 2016/0227523 A1 Aug. 4, 2016

Related U.S. Application Data

(60) Provisional application No. 62/109,913, filed on Jan. 30, 2015.

(51) Int. Cl.
*H04L 1/00* (2006.01)
*H04L 1/18* (2006.01)
(Continued)

(52) U.S. Cl.
CPC ............ *H04W 72/042* (2013.01); *H04L 5/001* (2013.01); *H04L 1/0031* (2013.01); *H04L 1/1896* (2013.01);
(Continued)

(58) Field of Classification Search
CPC ........ H04L 1/0031; H04L 1/1896; H04L 5/00; H04L 5/001; H04L 5/0092; H04L 5/0094;
(Continued)

(56) References Cited

U.S. PATENT DOCUMENTS 8,855,027 B2* 10/2014 Kim .................. H04L 5/001
 370/278
8,989,026 B2* 3/2015 Gaal .................. H04L 5/001
 370/252

(Continued)

FOREIGN PATENT DOCUMENTS

CN 101478808 A 7/2009
CN 102349346 A 2/2012
(Continued)

OTHER PUBLICATIONS

Bhamri et al, Massive carrier aggregation in LTE-advanced pro: impact on uplink control information and corresponding enhancements, May 18, 2016, IEEE, IEEE Communications Magazine, vol. 54, No. 5, pp. 92-97.*

(Continued)

*Primary Examiner* — Eric Nowlin
(74) *Attorney, Agent, or Firm* — Slater Matsil, LLP

(57) ABSTRACT

A method for allocating network resources to user equipments (UEs) includes configuring a first group of component carriers with resource allocations indicated by a joint downlink control information (DCI) message, configuring a second group of component carriers with resource allocations for each component carrier indicated by a dedicated DCI message, generating the joint DCI message indicating first resource allocations for a first subset of the first group of component carriers, generating a plurality of dedicated DCI messages, wherein each dedicated DCI message indicates a second resource allocation for a component carrier in a second subset of the second group of component carriers, mapping each one of the joint DCI message and the plurality of dedicated DCI messages to a control channel, and sending the control channels to the UE.

22 Claims, 8 Drawing Sheets

US 10,264,564 B2
Page 2

(51) Int. Cl.
*H04L 5/00* (2006.01)
*H04L 27/00* (2006.01)
*H04W 72/04* (2009.01)

(52) U.S. Cl.
CPC ........ *H04L 5/0094* (2013.01); *H04L 27/0006* (2013.01)

(58) Field of Classification Search
CPC .. H04L 27/0006; H04L 5/0053; H04W 24/02; H04W 72/0453; H04W 16/14; H04W 72/04; H04W 72/0406; H04W 72/042; H04W 72/14
See application file for complete search history.

(56) References Cited

U.S. PATENT DOCUMENTS

| | | | | |
|---|---|---|---|---|
| 8,995,363 | B2 * | 3/2015 | Suzuki | H04L 5/001 370/329 |
| 8,995,376 | B2 * | 3/2015 | Pan | H04L 5/001 370/329 |
| 9,065,600 | B2 * | 6/2015 | Miao | H04L 5/001 |
| 9,148,881 | B2 * | 9/2015 | Takeda | H04W 72/042 |
| 9,236,992 | B2 * | 1/2016 | Chung | H04L 5/001 |
| 9,258,750 | B2 * | 2/2016 | Li | H04W 36/0072 |
| 9,357,549 | B2 * | 5/2016 | Kim | H04L 5/0091 |
| 9,497,748 | B2 * | 11/2016 | He | H04W 4/06 |
| 9,585,133 | B2 * | 2/2017 | Kim | H04L 5/0091 |
| 9,603,164 | B2 * | 3/2017 | Davydov | H04L 5/001 |
| 9,615,267 | B2 * | 4/2017 | Fu | H04W 24/02 |
| 9,674,809 | B1 * | 6/2017 | Ramamurthy | H04W 56/002 |
| 9,674,855 | B2 * | 6/2017 | Chen | H04L 1/1854 |
| 9,820,241 | B2 * | 11/2017 | Suzuki | H04L 5/001 |
| 9,820,269 | B2 * | 11/2017 | Pan | H04L 5/001 |
| 9,860,044 | B2 * | 1/2018 | Astely | H04L 5/001 |
| 9,887,812 | B2 * | 2/2018 | Yang | H04L 5/001 |
| 9,955,465 | B2 * | 4/2018 | He | H04W 72/042 |
| 10,051,657 | B2 * | 8/2018 | Yasukawa | H04W 72/1289 |
| 10,070,383 | B2 * | 9/2018 | Fwu | H04W 52/04 |
| 10,070,478 | B2 * | 9/2018 | He | H04L 5/0053 |
| 2010/0135237 | A1 * | 6/2010 | Papasakellariou | H04L 5/0007 370/329 |
| 2010/0232373 | A1 | 9/2010 | Nory et al. | |
| 2011/0075624 | A1 * | 3/2011 | Papasakellariou | H04L 5/0053 370/329 |
| 2011/0228724 | A1 * | 9/2011 | Gaal | H04L 5/001 370/328 |
| 2011/0243066 | A1 * | 10/2011 | Nayeb Nazar | H04L 1/007 370/328 |
| 2011/0267978 | A1 * | 11/2011 | Etemad | H04L 5/003 370/254 |
| 2012/0320840 | A1 * | 12/2012 | Kim | H04L 5/001 370/329 |
| 2013/0114572 | A1 * | 5/2013 | Fong | H04W 56/0045 370/336 |
| 2013/0258864 | A1 * | 10/2013 | Chen | H04L 1/1854 370/241 |
| 2013/0279432 | A1 * | 10/2013 | Li | H04W 72/0406 370/329 |
| 2013/0279462 | A1 * | 10/2013 | He | H04W 72/042 370/329 |
| 2014/0022960 | A1 * | 1/2014 | Fu | H04W 24/02 370/280 |
| 2014/0078944 | A1 * | 3/2014 | Yang | H04L 5/001 370/280 |
| 2014/0105154 | A1 * | 4/2014 | Yang | H04L 5/0053 370/329 |
| 2014/0126485 | A1 * | 5/2014 | Chen | H04L 5/0053 370/329 |
| 2014/0192775 | A1 * | 7/2014 | Li | H04W 36/0072 370/331 |
| 2014/0204897 | A1 * | 7/2014 | Takeda | H04W 72/042 370/329 |
| 2014/0307695 | A1 * | 10/2014 | Yang | H04L 1/18 370/329 |
| 2015/0043396 | A1 * | 2/2015 | Ekpenyong | H04L 5/1469 370/280 |
| 2015/0124743 | A1 * | 5/2015 | Damnjanovic | H04W 76/025 370/329 |
| 2015/0208398 | A1 * | 7/2015 | Pan | H04L 5/001 370/329 |
| 2015/0245376 | A1 * | 8/2015 | Bashar | H04L 1/18 370/277 |
| 2015/0249962 | A1 * | 9/2015 | Suzuki | H04L 5/001 370/329 |
| 2015/0264699 | A1 * | 9/2015 | Fwu | H04L 5/0001 370/329 |
| 2015/0305021 | A1 * | 10/2015 | Yang | H04L 5/0053 370/294 |
| 2015/0319753 | A1 * | 11/2015 | Chen | H04L 5/001 370/277 |
| 2015/0365949 | A1 * | 12/2015 | Kim | H04L 5/0091 370/329 |
| 2016/0007378 | A1 * | 1/2016 | Bertorelle | H04W 74/006 370/329 |
| 2016/0044599 | A1 * | 2/2016 | Damnjanovic | H04W 52/04 455/522 |
| 2016/0100447 | A1 * | 4/2016 | Chen | H04W 72/042 370/329 |
| 2016/0119928 | A1 * | 4/2016 | Wu | H04L 5/001 370/329 |
| 2016/0135143 | A1 * | 5/2016 | Won | H04W 72/005 370/312 |
| 2016/0183223 | A1 * | 6/2016 | Park | H04W 72/042 370/329 |
| 2016/0192388 | A1 * | 6/2016 | Ekpenyong | H04W 72/1284 370/329 |
| 2016/0212649 | A1 * | 7/2016 | Chen | H04W 24/10 |
| 2016/0227541 | A1 * | 8/2016 | Damnjanovic | H04W 72/042 |
| 2016/0227570 | A1 * | 8/2016 | Wei | H04L 5/0057 |
| 2016/0262148 | A1 * | 9/2016 | Kim | H04L 5/0091 |
| 2016/0286603 | A1 * | 9/2016 | Vajapeyam | H04W 76/048 |
| 2016/0302176 | A1 * | 10/2016 | Ahn | H04W 72/042 |
| 2016/0309467 | A1 * | 10/2016 | Yerramalli | H04W 72/0446 |
| 2016/0323873 | A1 * | 11/2016 | Takeda | H04L 5/001 |
| 2016/0337112 | A1 * | 11/2016 | Suzuki | H04L 5/001 |
| 2016/0337160 | A1 * | 11/2016 | Sano | H04W 72/042 |
| 2016/0345206 | A1 * | 11/2016 | Yerramalli | H04W 28/12 |
| 2016/0345299 | A1 * | 11/2016 | Suzuki | H04W 72/042 |
| 2016/0352493 | A1 * | 12/2016 | Tan Bergstrom | H04L 5/001 |
| 2016/0380779 | A1 * | 12/2016 | Sharma | H04W 72/1215 370/312 |
| 2017/0063506 | A1 * | 3/2017 | Astely | H04L 5/001 |
| 2017/0086173 | A1 * | 3/2017 | He | H04W 4/06 |
| 2017/0094545 | A1 * | 3/2017 | Subrahmanya | H04L 1/0027 |
| 2017/0105179 | A1 * | 4/2017 | Kusashima | H04W 52/146 |
| 2017/0126370 | A1 * | 5/2017 | Yang | H04L 5/001 |
| 2017/0288824 | A1 * | 10/2017 | Moon | H04L 5/001 |
| 2017/0302419 | A1 * | 10/2017 | Liu | H04W 48/12 |
| 2018/0041974 | A1 * | 2/2018 | Suzuki | H04L 5/001 |
| 2018/0077698 | A1 * | 3/2018 | Takeda | H04L 1/1861 |
| 2018/0083684 | A1 * | 3/2018 | He | H04B 7/0626 |
| 2018/0123762 | A1 * | 5/2018 | Astely | H04L 5/001 |
| 2018/0146455 | A1 * | 5/2018 | Takeda | H04L 5/0055 |
| 2018/0205524 | A1 * | 7/2018 | Ekpenyong | H04L 5/1469 |
| 2018/0227885 | A1 * | 8/2018 | Lee | H04J 11/00 |
| 2018/0295540 | A1 * | 10/2018 | Akkarakaran | H04W 28/0278 |

FOREIGN PATENT DOCUMENTS

| | | | |
|---|---|---|---|
| CN | 102668672 A | 9/2012 | |
| CN | 104919746 A * | 9/2015 | ........... H04L 5/0053 |
| EP | 2915277 A1 * | 9/2015 | ........... H04L 5/0053 |
| JP | WO 2016189766 A1 * | 12/2016 | ............... H04L 5/00 |
| KR | 20130114572 A * | 10/2013 | ............. G06Q 30/02 |
| KR | 20160007378 A * | 1/2016 | ........... B29C 43/021 |
| KR | 20160135143 A * | 11/2016 | |
| WO | 2011132721 A1 | 10/2011 | |

(56) References Cited

FOREIGN PATENT DOCUMENTS

| WO | WO-2014070761 A1 * | 5/2014 | ............ H04L 5/0053 |
| WO | WO-2015018082 A1 * | 2/2015 | ............ H04L 5/0096 |
| WO | WO-2017171422 A1 * | 10/2017 | ............... H04L 5/00 |

OTHER PUBLICATIONS

Kwon et al., Licensed-Assisted Access to Unlicensed Spectrum in LTE Release 13, Dec. 14, 2016, IEEE, IEE Communications Magazine, vol. 55, Issue 2, pp. 201-207.*

Qualcomm et al.: "Way Forward on Scheduling Modes for LAA CCs", 3GPP TSG-RAN WG1#80B RL-152294, Apr. 24, 2015 (Apr. 24, 2015), XP050935114, Retrieved from the Internet.*

Panasonic, R1-101249_PDCCH with cross carrier operation, 3GPP TSG-RAN WG1 Meeting #60, Jan. 26, 2010, 3GPP (Year: 2010).*

Ericsson et al., R1-10041: Mapping of CIF to component carriers, 3GPP TSG RAN WG1 Meeting #59bis, Jan. 22, 2010, 3GPP (Year: 2010).*

CATT, Enhancements to support carrier aggregation with up to 32 component carriers, Feb. 13, 2015, Tdoc: R1-150103, 3GPP TSG RAN WG1 Meeting #80 (Year: 2015).*

CATT, Enhancements to DL control signaling for Rel-13 CA, Feb. 13, 2015, 3GPP TSG RAN WG1 Meeting #80 (Year: 2015).*

Alcatel-Lucent et al., Enhancements to DL control signalling for up to 32 component carriers, Feb. 13, 2018, 3GPP TSG RAN WG1 Meeting #80 (Year: 2015).*

HTC, DL control grouping for LAA, May 29, 2015, 3GPP TSG RAN WG1 Meeting #81 (Year: 2015).*

Nokia et al., New WI proposal: LTE Carrier AggregationEnhancement Beyond 5 Carriers, Dec. 11, 2014, Tdoc: RP 142286, 3GPP TSG RAN Meeting #66 (Year: 2014).*

3rd Generation Partnership Project; Technical Specification Group Radio Access Network; Evolved Universal Terrestrial Radio Access (E-UTRA); Multiplexing and channel coding (Release 11), 3GPP TS 36.212 V11.6.0, Technical Specification, Sep. 2015, 84 pages.

3rd Generation Partnership Project; Technical Specification Group Radio Access Network; Evolved Universal Terrestrial Radio Access (E-UTRA); Physical layer procedures (Release 11), 3GPP TS 36.213 V11.11.0, Technical Specification, Jun. 2015, 183 pages.

"New WI proposal: LTE Carrier Aggregation Enhancement Beyond 5 Carriers," 3GPP TSG RAN Meeting #66, RP-142286, Maui, Hawaii, Dec. 8-11, 2014, 9 pages.

* cited by examiner

SYSTEM AND METHOD FOR RESOURCE ALLOCATION FOR MASSIVE CARRIER AGGREGATION

This application claims the benefit of U.S. Provisional Application No. 62/109,913, filed on Jan. 30, 2015, entitled "System and Method for Resource Allocation for Massive Carrier Aggregation," which application is hereby incorporated herein by reference.

TECHNICAL FIELD

The present disclosure relates generally to digital communications, and more particularly to a system and method for resource allocation.

BACKGROUND

Carrier aggregation (CA) is a technique used to increase communications system bandwidth. In CA, multiple component carriers are aggregated (or combined) to yield a carrier with greater bandwidth than the individual component carriers. The component carriers may be contiguous or non-contiguous. Carrier aggregation can be considered for licensed component carriers only, or a mixture of licensed and unlicensed component carriers.

In the Third Generation Partnership Project (3GPP) Long Term Evolution (LTE) Release-12 technical standards, aggregation of up to 5 component carriers is permitted. However, in the development of subsequent releases, the number of component carriers is increased. For example, in 3GPP LTE Release-13, up to 32 component carriers may be aggregated. It is expected that the maximum allowable number of component carriers will continue to increase.

SUMMARY OF THE DISCLOSURE

Example embodiments provide a system and method for resource allocation.

In accordance with an example embodiment, a method for allocating resources of component carriers to a user equipment (UE) is provided. The method includes configuring, by a communications controller, a first group of component carriers with resource allocations indicated by a joint downlink control information (DCI) message, configuring, by the communications controller, a second group of component carriers with resource allocations for each component carrier indicated by a dedicated DCI message, generating, by the communications controller, the joint DCI message indicating first resource allocations for a first subset of the first group of component carriers, generating, by the communications controller, a plurality of dedicated DCI messages, wherein each dedicated DCI message indicates a second resource allocation for a component carrier in a second subset of the second group of component carriers, mapping, by the communications controller, each one of the joint DCI message and the plurality of dedicated DCI messages to a control channel, and sending, by the communications controller, the control channels to the UE.

In accordance with another example embodiment, a method for determining allocated resources of component carriers is provided. The method includes receiving, by a user equipment (UE), a component carrier configuration indicating a first group of component carriers and a second group of component carriers, where resource allocations for the first group of component carriers are indicated by a joint downlink control information (DCI) message and resource allocations for each component carrier of the second group of component carriers is indicated by a dedicated DCI message, receiving, by the UE, control channels indicating allocations of a first subset of the first group of component carriers and allocations of a second subset of the second group of component carriers, and communicating, by the UE, data in accordance with the allocations of the first subset and the second subset.

In accordance with another example embodiment, a communications controller adapted to allocate component carriers to a user equipment (UE) is provided. The communications controller includes a processor, and a computer readable storage medium storing programming for execution by the processor. The programming including instructions to configure the communications controller to configure a first group of component carriers with resource allocations indicated by a joint downlink control information (DCI) message, configure a second group of component carriers with resource allocations for each component carrier indicated by a dedicated DCI message, generate the joint DCI message indicating first resource allocations for a first subset of the first group of component carriers, generate a plurality of dedicated DCI messages, wherein each dedicated DCI message indicates a second resource allocation for a component carrier in a second subset of the second group of component carriers, map each one of the joint DCI message and the plurality of dedicated DCI messages to a control channel, and send the control channels to the UE.

In accordance with another example embodiment, a user equipment (UE) adapted to determine allocated network resources is provided. The UE includes a processor, and a computer readable storage medium storing programming for execution by the processor. The programming including instructions to configure the UE to receive a component carrier configuration indicating a first group of component carriers and a second group of component carriers, where resource allocations for the first group of component carriers are indicated by a joint downlink control information (DCI) message and resource allocations for each component carrier of the second group of component carriers is indicated by a dedicated DCI message, receive control channels indicating allocations of a first subset of the first group of component carriers and allocations of a second subset of the second group of component carriers, and communicate data in accordance with the allocations of the first subset and the second subset.

Practice of the foregoing embodiments enables the complexity involved in signaling resource allocations in a communications system with carrier aggregation to increase at a slower rate as the number of component carriers increases.

Furthermore, practice of the foregoing embodiments enables the complexity involved in searching for the signaling of resource allocations to increase at a slower rate than the increase in the number of component carriers.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for resource allocation. For example, a communications controller configures a first group of component carriers with resource allocations indicated by a joint downlink control information (DCI) message, configures a second group of component carriers with resource allocations for each component carrier indicated by a dedicated DCI message, generates the joint DCI message indicating first resource allocations for a first subset of the first group of component carriers, generates a plurality of dedicated DCI messages, wherein each dedicated DCI message indicates a second resource allocation for a component carrier in a second subset of the second group of component carriers, maps each one of the joint DCI message and the plurality of dedicated DCI messages to a control channel, and sends the control channels to the UE.

The embodiments will be described with respect to example embodiments in a specific context, namely communications systems that support carrier aggregation (CA) and signaling to indicate resource allocations. The embodiments may be applied to standards compliant communications systems, such as those that are compliant with Third Generation Partnership Project (3GPP), IEEE 802.11, and the like, technical standards, and non-standards compliant communications systems, that support CA and signaling to indicate resource allocations.

Figure 1:
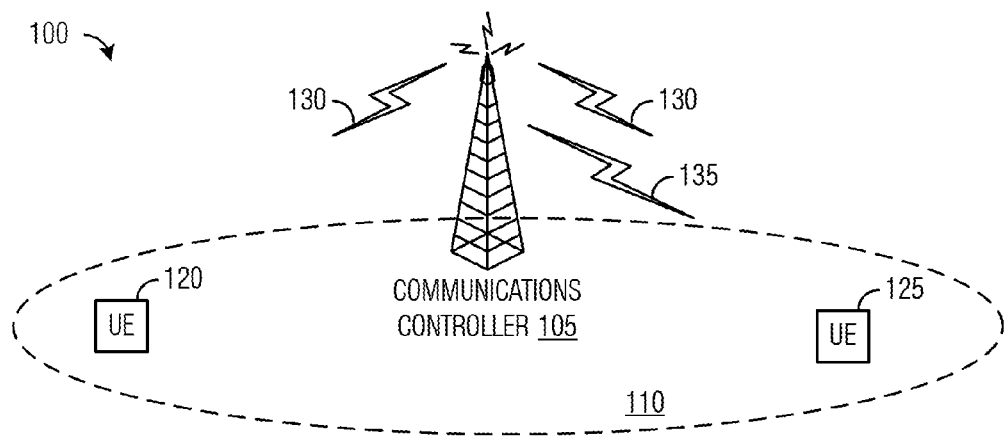
FIG. 1 illustrates an example first example wireless communications system according to example embodiments described herein.

FIG. 1 illustrates a first example wireless communications system 100. Wireless communications system 100 includes a communications controller 105 with a corresponding coverage area 110. Communications controller 105 may also be referred to as a base station (BS), a controller, a NodeB, an evolved NodeB (eNB), access point, and the like. Wireless communications system 100 also includes a plurality of user equipments (UEs), such as UE 120 and UE 125, which are served by communications controller 105. The UEs may also be referred to as mobile stations, mobiles, users, terminals, subscribers, station (STA), and so on.

While it is understood that communications systems may employ multiple communications controllers capable of communicating with a number of UEs, only one communications controller and a number of UEs are illustrated for simplicity.

Wireless communications system 100 supports CA. Hence, communications controller 105 may provide 2 or more component carriers, such as component carrier 130 and component carrier 135. As shown in FIG. 1, component carriers 130 and 135 are downlink component carriers. However, uplink component carriers, as well as full duplex component carriers are possible. Component carriers could either be licensed carriers or unlicensed carriers.

There may be a communications controller for each component carrier. As shown in FIG. 1, the communications controllers may be co-located. Individual UEs may communicate using 1 or more component carrier. As an illustrative example, UE 120 may operate using component carrier 130 while UE 125 may operate on component carriers 130 and 135. It is noted that component carriers 130 and 135 may be in the same frequency band, e.g., the ultra-high frequency (UHF) band spanning from 300 MHz to 1 GHz, or in different bands, e.g., component carrier 130 is in the UHF band while component carrier 135 is the S band (2-4 GHz). Furthermore, each component carrier can be paired or unpaired. A paired component carrier has a downlink (DL) frequency $f_1$ and an uplink (UL) frequency $f_2$, where there is a fixed offset between frequencies $f_1$ and $f_2$, for instance, 100 MHz. A paired component carrier is typically used for frequency division duplexing (FDD). In contrast, an unpaired component carrier uses just one frequency $f_1$, for both UL and DL. An unpaired component carrier is typically used for time division duplexing (TDD). In a TDD communications system, for certain time periods, DL transmissions are allowed from the communications controller 105 to UEs 120 and 125. Other time periods, UL transmissions are allowed from UEs 120 and 125 to communications controller 105.

Figure 2:
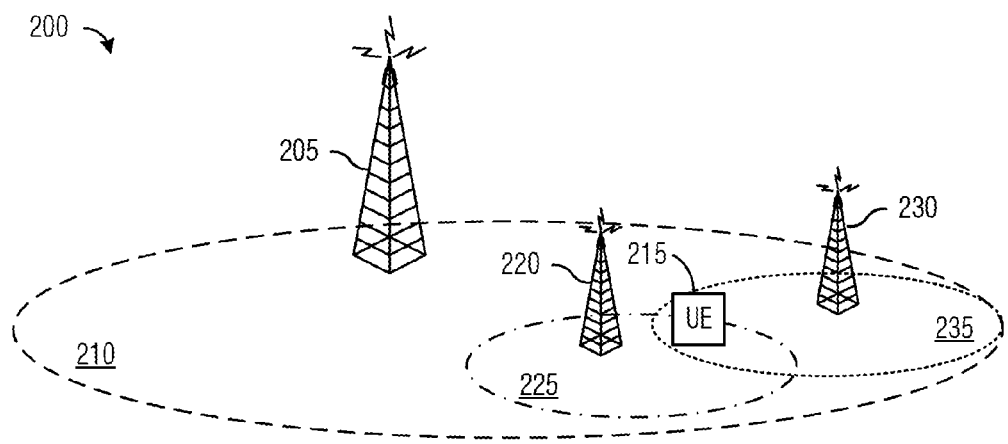
FIG. 2 illustrates an example second example wireless communications system according to example embodiments described herein.

FIG. 2 illustrates a second example wireless communications system 200. Wireless communications system 200 includes a communications controller 205 with corresponding coverage area 210. A UE 215 is served by communications controller 205. Wireless communications system 200 is a heterogeneous deployment where communications controller 205 provides at least one downlink component carrier. Wireless communications system 200 also includes communications controllers 220 and 230. Communications controllers 220 and 230 may be pico communications controllers that transmit at lower power levels and have correspondingly smaller coverage areas 225 and 235, respectively. Communications controller 205 can have a set of one or more component carriers $S_A=(f_{a,1}, \ldots, f_{a,n})$. Communications controller 220 can have another set of component carriers $S_B=(f_{b,1}, \ldots, f_{b,m})$, while communications controller 230 can have a third set of component carriers $S_C=(f_{c,1}, \ldots, f_{c,p})$. There are no restrictions on the size and number of component carriers in the sets. For example, $S_A$ may contain $f_1, f_2, f_3, f_4$; $S_B$ may contain $f_2, f_5$; $S_B$ may contain $f_3, f_6$; and so on.

In CA, a UE is able to receive data (in the DL) on 1 or more component carriers from 1 or more communications controllers. Typically, the component carriers are time aligned to facilitate scheduling, feedback, and processing. There are two types of scheduling mechanisms used for CA: self-scheduling and cross-carrier scheduling. With self-scheduling, scheduling information of data for carrier j is transmitted on carrier j. With cross-carrier scheduling, scheduling information of data for carrier j is transmitted on carrier k, where indices j and k can be different. As an example, in cross-carrier scheduling, carrier 1 carries scheduling information for itself and one or more other carriers.

Figure 3:
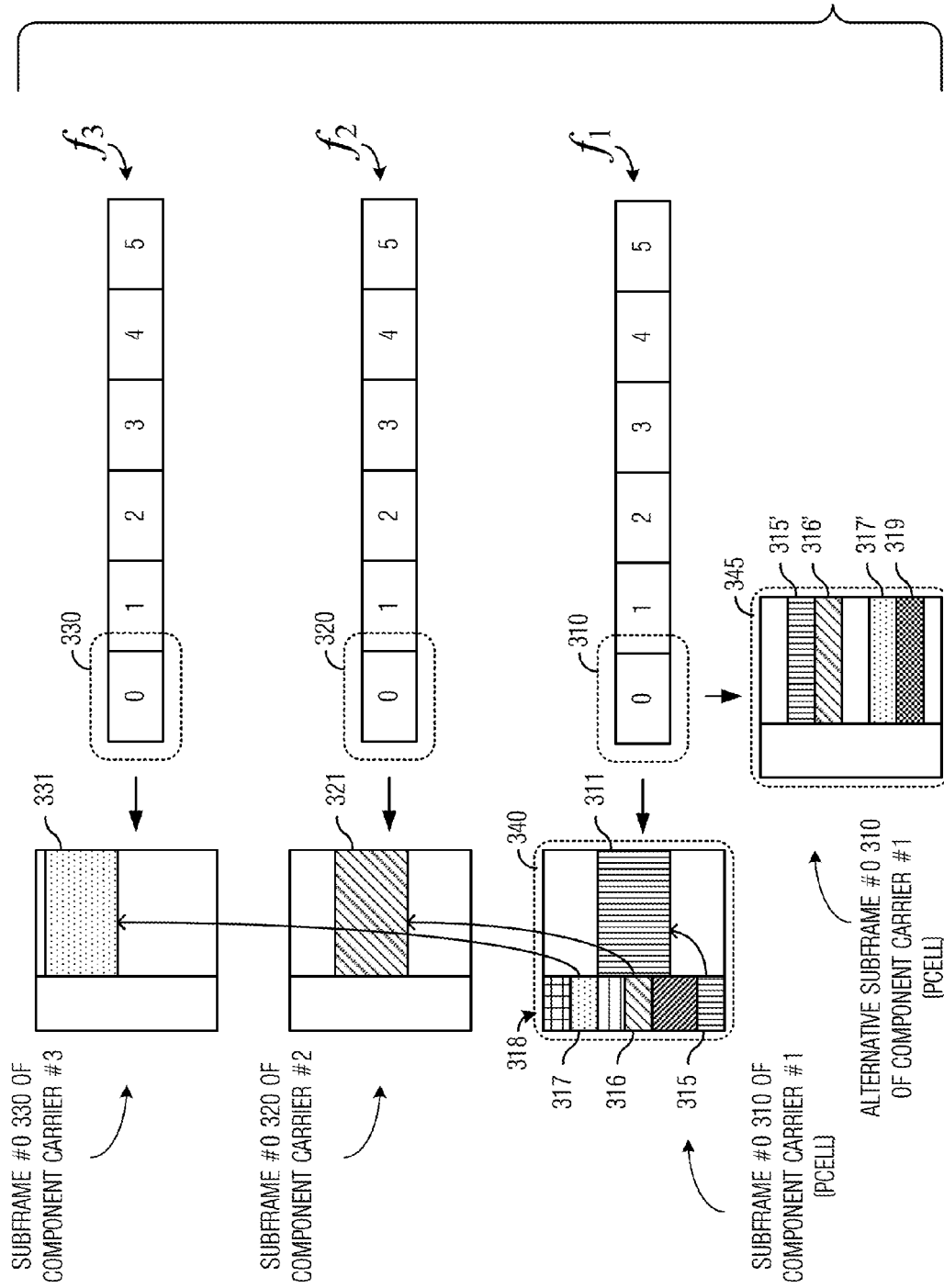
FIG. 3 illustrates an example CA deployment with 3 component carriers and cross-carrier scheduling according to example embodiments described herein.

FIG. 3 illustrates an example CA deployment with 3 component carriers and cross-carrier scheduling. The 3 component carriers (component carrier #1, component carrier #2, and component carrier #3) are at frequencies $f_1$, $f_2$, and $f_3$, respectively. In cross-carrier scheduling, scheduling information for multiple component carriers is conveyed in a single component carrier, e.g., a primary carrier. The remaining carriers are referred to as secondary carriers. In the example CA deployment shown in FIG. 3, component carrier #1 is the primary carrier and component carriers #2 and #3 are secondary carriers.

A subframe is a group of symbols, for example, 14 orthogonal division frequency division (OFDM) symbols and is 1 millisecond in duration. Typically, a subframe can be partitioned into a control region (e.g., the first several symbols of the subframe) and a data region (remaining symbols of the subframe). The frequency of component carrier #1 is represented by $f_1$ while the frequencies for the component carriers #2 and #3 are represented by $f_2$ and $f_3$. Subframe #0 310 of component carrier #1 conveys the cross-scheduling information, denoted as downlink control information (DCI) for subframe #0 310 of component carrier #1 (on frequency $f_1$), subframe #0 320 of component carrier #2 (on frequency $f_2$), and subframe #0 330 of component carrier #3 (on frequency $f_3$). Each DCI can be transmitted in the control region 318 of subframe #0 310 using the physical downlink control channel (PDCCH). A DCI can provide scheduling information for downlink transmissions or for uplink transmissions.

As an example, in highlight 340, a DCI 315 provides scheduling information for a physical downlink shared channel (PDSCH) 311 in subframe #0 310 of component carrier #1. Likewise, a DCI 316 provides scheduling information for a PDSCH 321 in subframe #0 320 of component carrier #2. Similarly, a DCI 317 provides scheduling information for a PDSCH 331 in subframe #0 330 of component carrier #3. Alternatively, in highlight 345, the enhanced physical downlink control channel (EPDCCH), which would be located in the data region of a subframe, can be used to convey the DCIs. The operations using the EPDCCH are analogous to the PDCCH. Hence, in highlight 345, a DCI 315' provides scheduling information for a PDSCH 311 in subframe #0 310 of component carrier #1, a DCI 316' provides scheduling information for a PDSCH 321 in subframe #0 320 of component carrier #2, and a DCI 317' provides scheduling information for a PDSCH 331 in subframe #0 330 of component carrier #3. The communications controller can provide configuration information to the UE to identify physical resource block (PRB) pairs that can convey the EPDCCH. In the example, the PRB pairs are denoted by 319. As an example, PRB pairs 319 can convey DCIs 315', 316', and 317'. With self-scheduling, a UE must monitor the control channels on each component carrier to obtain scheduling information for that component carrier. With cross-carrier scheduling, a UE monitors the control channels on a particular (designated) component carrier to obtain scheduling information of each component carrier.

Signaling capacity is defined by the number of control channel elements (CCEs) in the control region of a subframe (e.g., control region 318) or the number of enhanced CCEs (ECCEs) used for the EPDCCH (e.g., PRB pairs 319) and the aggregation level (L) which is the number of consecutive CCEs/ECCEs for the PDCCH/EPDCCH for a DCI. The aggregation level can be inversely related to a coding rate, where a low coding rate can improve the probability of receiving the DCI correctly. While the number of CCEs in the control region can be large, for example approximately 80 CCEs for a carrier with a 20 MHz under certain system configurations, the number of DCIs that can be transmitted is a function of the aggregation level. If all UEs require an aggregation level of 8, at most 10 PDCCHs can be placed in the control region, where a single DCI is encoded into a single PDCCH. The capacity observations for the EPDCCH are similar.

The 3GPP Technical Standard 36.212 Release 11 dated 2015-09, which is incorporated herein by reference, DCIs for a variety of transmission modes are defined. Table 1 displays an example of the scheduling information included in the DCI. There may be additional information related to scheduling depending on the transmission mode and the type of duplexing used for the particular component carrier.

TABLE 1

Scheduling information of an example DCI.

| Name | Purpose | Number of bits |
|---|---|---|
| CIF (carrier indicator field) | Identifies the logical carrier number | 3 |
| Resource allocation field | Which resource block (RB) pairs are allocated for PDSCH for that UE | Function of bandwidth and allocation type |
| Modulation coding scheme (MCS) | Modulation used for PDSCH. Indirect indicator of coding rate | 5 |
| New data indicator (NDI) | New data or retransmission | 1 |
| Redundancy version (RV) | Indicates which set of encoded bits are transmitted | 2 |
| HARQ process number | Hybrid automatic repeat request (HARQ) number for stop and wait process | 3-4 bits |

The resource allocation fields have information that indicate which resource block (RB) pairs are used. As an example, with resource allocation type 0, a bit map as defined in Section 7.1.6.1 of 3GPP Technical Standard 36.213 Release 11 dated 2015-06, which is incorporated herein by reference, indicates the RB pairs used. Effectively, the length of the bit map is a function of the DL bandwidth of the component carrier. As an illustrative example, using resource block group (RBG) size P as defined in Section 7.1.6.1 of 3GPP Technical Standard 36.213, the number of RBGs, $N_{RBG}$, as a function of DL bandwidth $N_{RB}^{DL}$, is shown in Table 2.

TABLE 2

Number of RBGs as a function of DL bandwidth.

| $N_{RB}^{DL}$ | P | $N_{RBG}$ |
|---|---|---|
| 6 | 1 | 6 |
| 15 | 2 | 8 |
| 25 | 2 | 13 |
| 50 | 3 | 17 |

TABLE 2-continued

Number of RBGs as a function of DL bandwidth.

| $N_{RB}^{DL}$ | P | $N_{RBG}$ |
|---|---|---|
| 75 | 4 | 19 |
| 100 | 4 | 25 |

As another illustrative example, for the case with $N_{RB}^{DL}=50$ bandwidth, the bit mask has a length of 17 with numbering beginning at 0 and ending at 16. P=3 indicates that each bit in the bitmask represents 3 RB pairs. In this example, the last bit in the mask represents 2 RB pairs. Setting a binary '1' in bit 0 can indicate that resource block pairs 0, 1, and 2 would be used for the PDSCH, for example.

Resource allocation type 2 can be used to signal N contiguous RB pairs and a starting RB pair number. For example, for the case with $N_{RB}^{DL}=50$ bandwidth, there can be N=26 continuous RB pairs starting at RB pair 13; meaning that RB pairs 13 through 38 are allocated.

As discussed previously, massive CA (mCA) increases the number of component carriers from 5 to a maximum of 32. While the increase is logically possible, there are potential technical problems with this increase. Among the problems is scheduling. The current procedure associates 1 DCI to each PDSCH. An analogous relationship of 1 DCI to each physical uplink shared channel (PUSCH) also exists. It is noted that a PDSCH can convey one or two codewords (e.g., data packets). With 5 carriers, 5 DCIs would be needed for 5 PDSCH. With this association, having up to 32 carriers implies that up to 32 DCIs would be needed. There are two ramifications with this increase in DCIs. First, the signaling capacity is finite with this many carriers to schedule (using cross-carrier scheduling). Another problem is the complexity in detecting a DCI. The technical standards define search space rules indicating which CCEs for a given aggregation level can be used to convey a DCI to a particular UE. Since the complexity is proportional to the number of carriers used, a large number of carriers imply a large complexity involved in detecting the DCIs.

According to an example embodiment, systems and methods for communicating resource assignments in either the UL or DL are provided. Example embodiments rely on a multi-tier resource allocation procedure. For some component carriers, a first resource allocation (e.g., a fine granularity) type is provided. A resource allocation of the first resource allocation type is similar to the resource allocation specified in 3GPP LTE Release-12 and is performed with a granularity of a RBG. Detailed multiple input multiple output (MIMO) resource allocations may be provided, with channel state information (CSI) provided on a per-RBG basis. For other component carriers, a second resource allocation (e.g., a coarse granularity) type is provided. The second resource allocation type is performed with a large RBG size (larger than the RBG size of the first resource allocation), and provides basic transmission parameters for MIMO, modulation/coding scheme (MCS), and so on. It is noted that without loss of generality, more than two resource allocation types can be used. As an illustrative example, there may be two variants of the second resource allocation type: one for licensed carriers and one for unlicensed carriers.

According to an example embodiment, the resource allocation assignments, both the first resource allocation and the second resource allocation types are sent on the primary carrier. Cross-carrier scheduling is supported.

Figure 4:
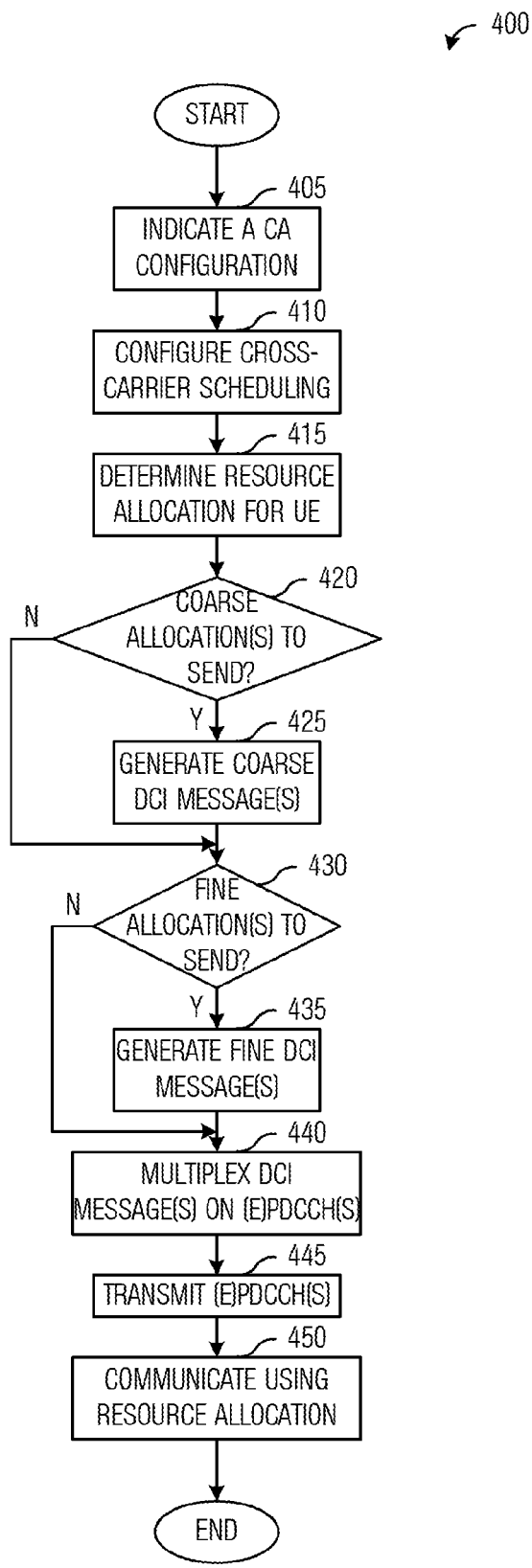
FIG. 4 illustrates a flow diagram of example operations occurring in a communications controller according to example embodiments described herein.

FIG. 4 illustrates a flow diagram of example operations 400 occurring in a communications controller. Operations 400 may be indicative of operations occurring in a communications controller as the communications controller allocates resources, signals the allocated resources, and communicates using the allocated resources. For the downlink, the term "communicates using the allocated resources" refers to the transmission of data (e.g., PDSCH) by the communications controller to a UE. For the uplink, the term "communicates using the allocated resources" refers to the reception of data (e.g., PUSCH) by the communications controller transmitted from a UE.

Operations 400 begin with the communications controller configuring component carriers for CA and indicating a CA configuration (block 405). The configuration of the component carriers specifies allocation granularities for component carriers, such as fine granularity and coarse granularity. The CA configuration can be conveyed to a UE using a radio resource control (RRC) message, either dedicated or common (broadcasted), or a combination of both. In this higher layer message, a list of component carriers is provided with, for each component carrier, an indication of whether a fine or coarse allocation (or third or more types if more allocation types are defined) is to be used. For instance, the message can contain:

The number of configured component carriers numCarriers;

A list of component carrier indexes carriers[0 . . . numCarriers-1];

A bitmap of length numCarriers with the $i^{th}$ bit of the bitmap indicating if the resource allocation for component carrier i is coarse ('0') or fine ('1'). This field is optional per the description of coarse DCI herein; and An index indicating which carrier is the PCell This field also is optional. Alternatively, it may be possible to modify an existing higher layer configuration, such as CrossCarrierSchedulingConfig, the configuration indicates which component carrier is used for cross-carrier scheduling. A field in the existing higher layer configuration may indicate the type of resource allocation (e.g., fine or coarse).

In another embodiment, the RRC message indicates "enable joint DCI" or the like, and it contains a component carrier list (as opposed to a bit map). Then if a joint DCI is received it is known (without bitmap) that those are implicitly coarse. For LTE operation with carrier aggregation, the resource allocation is done as follows:

For each component carrier, a resource allocation grant is defined;

Then, an individual DCI to convey the grant is defined for each of the component carriers; and All the individual DCIs are then sent to the UE.

Thus, if there are resource allocations on X component carriers, X DCIs will be sent to the UE. In order to reduce the signaling overhead and improve system performance, a joint DCI is defined. A joint DCI is a message carrying a resource allocation grant for a given UE wherein the resource allocation grant spans more than one component carrier. Thus, if there are resource allocations on X component carriers, a single joint DCI will be sent to the UE.

The joint DCI may cover resource allocation grants for several component carriers as follows:

a) a resource allocation where one transport block is sent on a single component carrier. In that case, the joint DCI contains resource allocation for a plurality of transport block sizes;

b) a resource allocation where one transport block can be sent on more than one component carriers.

c) a combination of a) and b)

Advantages of using a joint DCI include:

A single DCI is transmitted, thus reducing signaling overhead;

Reduced complexity since the search space can be reduced; and

Improved reliability since the UE needs to get only one DCI message as opposed to X DCI messages with the current LTE resource allocation principles.

One of the issues with a joint DCI is the size of the joint DCI when multiple DCIs are grouped together. For example, using the fields illustrated in Table 1 for 1 DCI and with 32 carriers, the size of the joint DCI is proportional to the length of 1 DCI and the number of carriers, which can exceed the payload dimensions of the existing PDCCH/EPDCCH. For example, using aggregation level L=8, the number of channel bits for PDCCH is 8 levels×9 CCEs/level×4 resource elements/CCE×2 bits/resource element=576 channel bits. After accounting for rate 1/2 channel coding and a 16 bit cyclic redundancy check (CRC) code, the size of the joint DCI is 272 bits. With 32 carriers, the length of the DCI for each component carrier should be less than 9 bits. Examining Table 1, the length of the DCI is more than 9 bits. In order to use a joint DCI, combinations of increasing its size and removing and/or modifying existing fields can be considered. Some examples include Using a larger aggregation level. This will increase the number of channel bits and hence the size of the joint DCI. Modification of search space rules may be needed.

modifying existing fields, for example use coarse resource allocation, combine HARQ process numbers, use a single MCS for all component carriers are possible.

The communications controller configures cross-carrier scheduling (block 410). The communication controller may instruct the UE to operate using cross-carrier scheduling:

The UE may detect that cross-carrier scheduling is enabled by attempting to blindly decode DCI formats for cross-carrier and self-scheduling (i.e., non-cross-carrier scheduling);

A DCI for a fine resource allocation received on a particular component carrier may apply to this particular component carrier only;

A DCI for a coarse resource allocation received on any component carrier would automatically apply for all component carriers;

A DCI for a coarse resource allocation may only be transmitted on the primary carrier (PCell); and An RRC message containing an information element (IE), such as the CrossCarrierSchedulingConfig IE, is transmitted from the communications controller to the UE.

The communications controller determines a resource allocation for a UE (block 415). The resource allocation may be for UL or DL, and may comprise resources on the component carriers where fine resource allocation is used, or where coarse resource allocation is used. Once the resource allocation has been determined, the following is performed by the communications controller:

For component carriers where some resources are assigned, and where a coarse resource allocation type is used, a DCI for a coarse resource allocation type is generated (one DCI for all component carriers configured for coarse resource allocation) (blocks 420 and 425). In this example, a joint DCI can be used.

For each component carrier where some resource is assigned, and where a fine resource allocation type is used, a DCI for a fine resource allocation type is generated (one DCI per component carrier) (blocks 430 and 435).

With the DCIs generated, the communications controller multiplexes (or maps) each DCI onto a PDCCH/EPDCCH (block 440) and transmits the PDCCH/EPDCCHs (block 445). The DCIs are mapped according to search space rules so that UEs know where to search to find the DCIs. The search space rules reduce search complexity at the UE. As an illustrative example, DCIs mapped onto PDCCHs are mapped according to rules for PDCCHs (such as rules specifying location, size, aggregation level, and so on), while those mapped onto EPDCCHs are mapped according to rules for EPDCCHs (such as rules specifying location, size, aggregation level, and so on). An example embodiment sends all DCIs (coarse and fine resource allocations) on the same component carrier (i.e., the primary carrier), although in other example embodiments, other solutions are possible. As an illustrative example, the joint DCI containing the coarse resource allocations for the component carriers configured for coarse resource allocation is transmitted on the primary carrier while the fine DCIs are sent on their respective component carriers. The communications controller communicates using the resource allocation (block 450).

Figure 5:
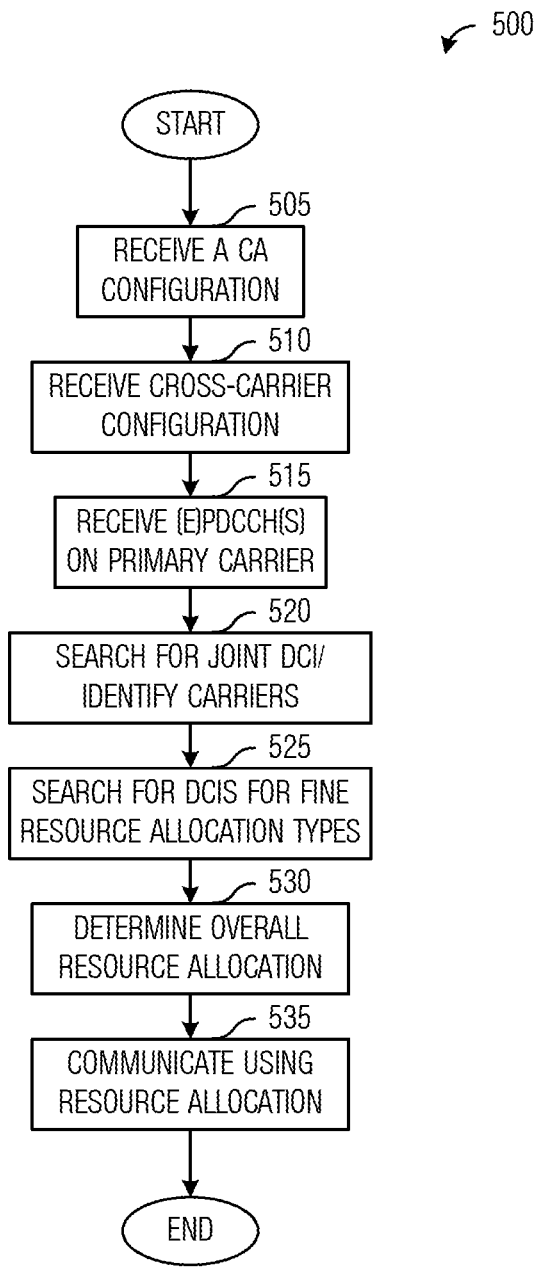
FIG. 5 illustrates a flow diagram of example operations occurring in a UE according to example embodiments described herein.

FIG. 5 illustrates a flow diagram of example operations 500 occurring in a UE. Operations 500 may be indicative of operations occurring in a UE as the UE receives signaling about resource allocations and communicates using the allocated resources.

Operations 500 begin with the UE receiving an indication of a CA configuration (block 505). The indication may be conveyed in a RRC message, either dedicated or common (broadcasted), or a combination of both. The configuration of the component carriers specifies allocation granularities for component carriers, such as fine granularity and coarse granularity. The UE receives a cross-carrier configuration (block 510). Alternatively, the UE may detect that cross-carrier scheduling is enable by blindly decoding DCI formats for cross-carrier and non-cross-carrier scheduling. The UE receives symbols corresponding to a subframe on component carriers. If a UE is configured to process the PDCCH/EPDCCHs, it uses search space rules to locate the PDCCHs in the control region (EPDCCHs in the data region) of a subframe. The UE receives a PDCCH/EPDCCHs (block 515). The PDCCH/EPDCCHs may be received on a primary carrier.

The UE searches for a joint DCI containing scheduling information for coarse resource allocation types for configured component carriers (block 520). The UE also identifies component carriers with coarse resource allocation types. The UE searches for DCIs for fine resource allocation types for one or more component carriers (block 525) if configured. These DCIs may be based on the existing DCI formats, such as DCI format 1A. The DCIs may be found through blind detection in the PDCCH/EPDCCHs, for example. The UE determines an overall resource allocation from the DCIs (block 530). The UE may combine the 1 or more resource allocations that it finds into the overall resource allocation. The UE communicates using the resource allocation on the selected component carriers (block 535).

The joint DCI format may include the following fields: a format indicator, uplink/downlink flag, resource allocation field, power control information, MCS, MIMO information, and hybrid automatic repeat requested (HARQ) parameters. The joint DCI format may also include a field for indicating which component carriers are scheduled in the joint DCI.

indicates the carrier (0 to 19). As shown in Table 3, component carriers 0, 5, 12, 16, and 19 are scheduled. All the resource blocks on those component carriers would be used.

TABLE 3

| 20 bit bitmap indicating component carrier allocation. | | | | | | | | | | | | | | | | | | | |
|---|---|---|---|---|---|---|---|---|---|---|---|---|---|---|---|---|---|---|---|
| M | | | | | | | | | | | | | | | | | | | L |
| 0 | 1 | 2 | 3 | 4 | 5 | 6 | 7 | 8 | 9 | 10 | 11 | 12 | 13 | 14 | 15 | 16 | 17 | 18 | 19 |
| 1 | 0 | 0 | 0 | 0 | 1 | 0 | 0 | 0 | 0 | 0 | 0 | 1 | 0 | 0 | 0 | 1 | 0 | 0 | 1 |

The format indicator may be present to indicate the DCI format for each component carrier in the joint DCI. For example, a UE typically has to detect 2 possible DCIs within each PDCCH/EPDCCH candidate, such DCI format 1A and format 2. The format indicator allows the same number of bits when two possible DCI formats can be used for a particular component carrier. The larger size of the two DCI formats can be used in the joint DCI for the size determination. For example, if DCI format 2 is 30 bits while DCI format 1A is 16 bits (using coarse resource allocation for a component carrier), the joint DCI would use 30 bits for both DCI format 1A and format 2 for this particular component carrier. The extra bits for DCI format 1A can be reserved or set to zero (zero padding). The use of the format indicator and the same size DCIs for each component carrier have the advantage of reducing the number of blind decoding attempts at the UE since the UE can decode a single size for the joint DCI. In some cases, the joint DCI may reuse some of the bits used for indicating the carrier indicator field (CIF) in existing DCI formats, for example. It is noted also that the format indicator may not be present in some example embodiments.

The uplink/downlink flag field is similar to a flag used to differentiate DCI formats 0 and 1A, and may be used in a case when a joint DCI for uplink allocation and a DCI for a downlink allocation have the same size. This flag may not be present if the joint DCI is only for DL.

For existing DCI formats, the resource allocation field typically indicates the set of RBs (virtual or physical) for the resource allocation. For the DCI for coarse resource allocation format, the resource allocation field serves the same purpose, but with a much large granularity. A granularity of 5 MHz may be appropriate since some carriers may be unlicensed and the 'Listen Before talk' procedure may be performed with a 5 MHz granularity. It is noted that depending on the number of transport blocks/codewords sent, the resource allocation field may be sent more than once. It is also noted that any resource allocation type (0, 1, 2-localized, 2-distributed) can be used, with the resource allocation field encoded accordingly.

In a per-carrier allocation solution according to an example embodiment, a UE is allocated either all the PRBs of a given component carrier, or none. A bitmap codes the allocation, for example, with the i-th bit indicating whether the entire i-th component carrier is allocated to this UE ('1') or not ('0'). According to the example embodiment, the bitmap may refer to all the component carriers or only the component carriers where coarse allocation is used. There may be other ways of placing this bitmap. For example, this i-th bit can be located with the other information for the i-th component carrier.

Table 3 displays an example of a 20-bit bitmap (bit mask) where the 'M' denotes the most significant bit while 'L' denotes the least significant bit of the bitmap. The index i With the example embodiment, there may be a UE specific configured set of component carriers that is a subset of the up to 32 component carriers (for 3GPP LTE Release-13), where the bitmap in the DCI only covers the configured component carriers. For example, if 8 component carriers are supported and an 8 bit map is present, and if three component carriers are configured then the first three bits correspond to known configured component carriers and the last 5 bits are don't care or set to a known value but not used. Another example may be with very fast carrier selection, e.g., only the used component carriers are included so no bitmap is needed and the size can be variable and sufficiently sized to convey the joint DCI. It is noted also that for this example embodiment, the notion of RBG as defined in 3GPP LTE does not apply. The allocation is simply the entire component carrier whatever it may happen to be.

According to an example embodiment, a bitmap codes a resource allocation for a large RBG (XRBG) deployment is provided. The entire available band is partitioned into extended RBs (XRBs). One XRB can correspond to a 5 MHz frequency block, for example. One XRB can be defined on one component carrier only, or may cover multiple component carriers. The XRB size can be dependent on the component carrier. The XRB size may be hardcoded in the standard specification, or communicated by the communications controllers to the UE (for instance, in the CA configuration message). As an illustrative example, the i-th bit of the bitmap indicates if the i-th XRB is allocated ('1') or not ('0'). It is noted that with this example embodiment, the previously defined notion of RBG in 3GPP LTE may not apply.

According to an example embodiment, techniques for power control are provided. With respect to power control information, in UL resource allocation messages it may be useful to indicate a power level at which to transmit. Illustrative example embodiments include:

The same power level is used across all component carriers. All component carriers are allocated the same power. A single TPC command (similar to existing DCI format 0) may be included and applied to all subcarriers. In a situation where multiple component carriers are used, the power sharing rules standardized for dual connectivity may be applicable.

The power level for different component carriers is preconfigured. The power level for each component carrier may be pre-configured and signaled using dedicated RRC signaling.

A power control command is used. A power control command similar to a DCI format 3/3A solution is sent. As an example, the power control command includes a bitmap with the i-th bit indicating a power correction to apply to the i-th component carrier (DCI format 3). Alternatively, power correction similar to DCI format 3A may be used. A bitmap may be included in the DCI for coarse resource allocation types. Alternatively, the bitmap may be sent using the existing DCI format 3/3A with modifications, including the cyclic redundancy check code (CRC) is scrambled with a cell radio network temporary identifier (C-RNTI) and the DCI may be sent in both the common and UE-specific search spaces.

A flag is used to indicate inclusion of power control commands in the DCI.

According to an example embodiment, rules similar to those presented above for power control are used to indicate MCS. Illustrative example embodiments include:

The same MCS is used across all component carriers. All component carriers are allocated the same MCS. The MCS is signaled in the joint DCI.

The MCS for different component carriers is pre-configured. The MCS for each component carrier may be pre-configured using dedicated RRC signaling.

An extended bitmap is used to signal MCS. The MCS for each component carrier is coded using k bits, where k is an integer value, e.g., 1, 2, or 3. Therefore, there are $2^k$ possible MCS levels for each component carrier. The $2^k$ possible MCS levels may be pre-configured and signaled using dedicated RRC signaling.

A DCI format 3-like solution is used to signal MCS. An extended bitmap is sent using a format similar to DCI format 3/3A.

A flag is used to indicate inclusion of MCS values in the DCI.

According to an example embodiment, open-loop MIMO is used with coarse resource allocation and joint DCI. A bitmap (or pre-configuration) may be included to indicate a number of streams used in MIMO. In some example embodiments, multiple antenna techniques, such as transmit diversity, are used. Signaling similar to existing DCI formats may be used to send control information.

According to an example embodiment, HARQ operation is supported. Illustrative example embodiments include:

A codeword (or two codewords) is used to support HARQ operation. A gigantic codeword (or 2 gigantic codewords when MIMO operation is supported) is sent on all coarse allocation component carriers. The codeword (or 2 codewords) may be acknowledged (ACKed) with a single bit.

Each component carrier is separately acknowledged. In a codeword (or 2 codeword) per coarse resource allocation component carrier, each component carrier may be separately ACKed. The acknowledgement may make use of ACK bundling, PUCCH format 3, and so on.

Two bits are used to acknowledge or not acknowledge. In a 1 codeword over licensed component carrier and a 1 codeword over unlicensed component carrier deployment, 2 bits are used to acknowledge/not acknowledge (ACK/NAK).

One bit is used to ACK licensed component carriers and one bit is used to ACK each unlicensed component carrier. In a 1 codeword over licensed component carrier and a 1 codeword per unlicensed component carrier deployment, 1 bit is used to ACK the licensed component carriers and 1 bit is used to ACK each unlicensed component carrier.

According to an example embodiment, the techniques disclosed herein are jointly operable. As an illustrative example, a bit field is added to the DCI to indicate which technique is used. For instance, 1 bit may indicate if ACK/NAK bundling is used for licensed component carriers, 1 bit may indicate if ACK/NAK bundling is used for unlicensed component carriers. In general, the bit field may indicate the format used to send ACK/NAK on the UL channel. It may or may not be linked to codeword formats being sent. The bit field may be signaled in another message, such as a RRC message, either dedicated or common.

Figure 6:
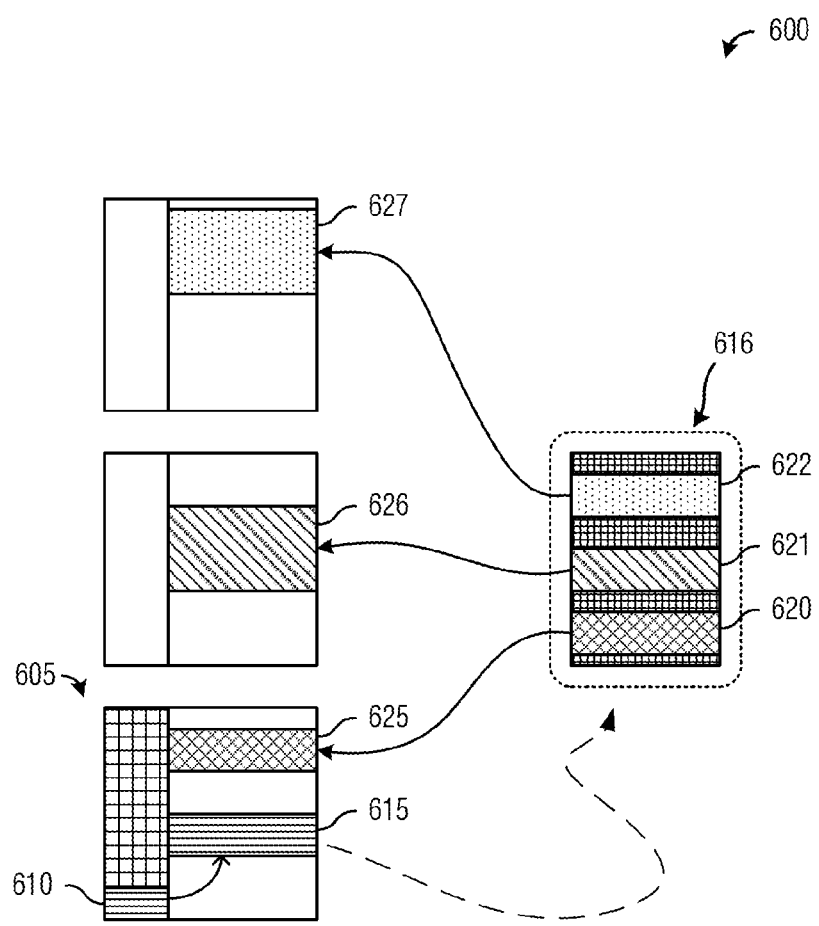
FIG. 6 illustrates an example pointer channel deployment according to example embodiments described herein.

FIG. 6 illustrates an example pointer channel deployment 600. A pointer channel is a channel that includes a pointer, e.g., a location of a network resource, to a pool of network resources. The pointer channel may be used to communicate the location of DCIs for fine resource allocations. The DCIs for fine resource allocations may make use of any existing 3GPP LTE DCI formats.

As shown in FIG. 6, a control region 605 includes a pointer channel DCI 610 transmitted on a PDCCH. It is noted that an alternative embodiment wherein a EPDCCH is used to convey pointer channel DCI 610. Pointer channel 610 points to a pointer PDSCH 615. Pointer PDSCH 615 may be located in the same component carrier as pointer channel DCI 610 (as shown in FIG. 6) or in a different component carrier. If pointer PDSCH 615 is on a different component carrier than pointer channel DCI 610, pointer channel DCI 610 may have a carrier indicator field (CIF) to indicate the component carrier of pointer channel DCI 610.

Highlight 616 illustrates a detailed view of pointer PDSCH 615. Pointer PDSCH 615 (as shown in detail in highlight 616) includes a plurality of DCIs, such as DCI 620, DCI 621, and DCI 622. DCI 620 includes scheduling information for PDSCH 625 in a component carrier located at $f_0$, DCI 622 includes scheduling information for PDSCH 626 in a component carrier located at $f_1$, and DCI 623 includes scheduling information for PDSCH 627 in a component carrier located at $f_2$. ACK/NAK feedback may be associated with the PDCCH carrying pointer channel DCI 610.

Figure 7:
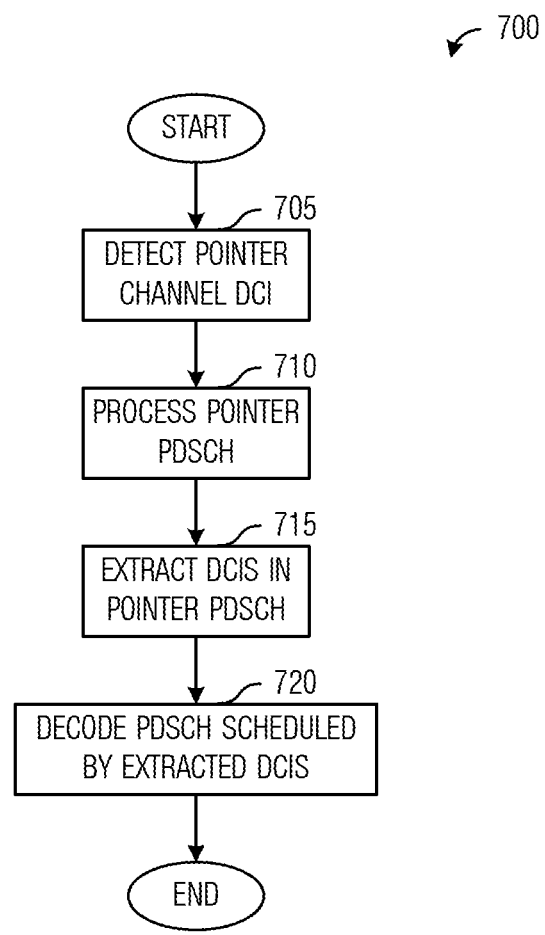
FIG. 7 illustrates a flow diagram of example operations occurring in a UE processing DCIs utilizing pointer channels according to example embodiments described herein.

FIG. 7 illustrates a flow diagram of example operations 700 occurring in a UE processing DCIs utilizing pointer channels. Operations 700 may be indicative of operations occurring in a UE that is processing DCIs using pointer channels.

Operations 700 begin with the UE detecting a pointer channel DCI (block 705). The pointer channel DCI may be detected in a PDCCH or EPDCCH using blind detection, for example. The UE processes the pointer channel DCI and associated pointer PDSCH (block 710). The DCIs in the pointer PDSCH are extracted (block 715) and the PDSCHs indicated in the extracted DCIs are decoded (block 720).

Figure 8:
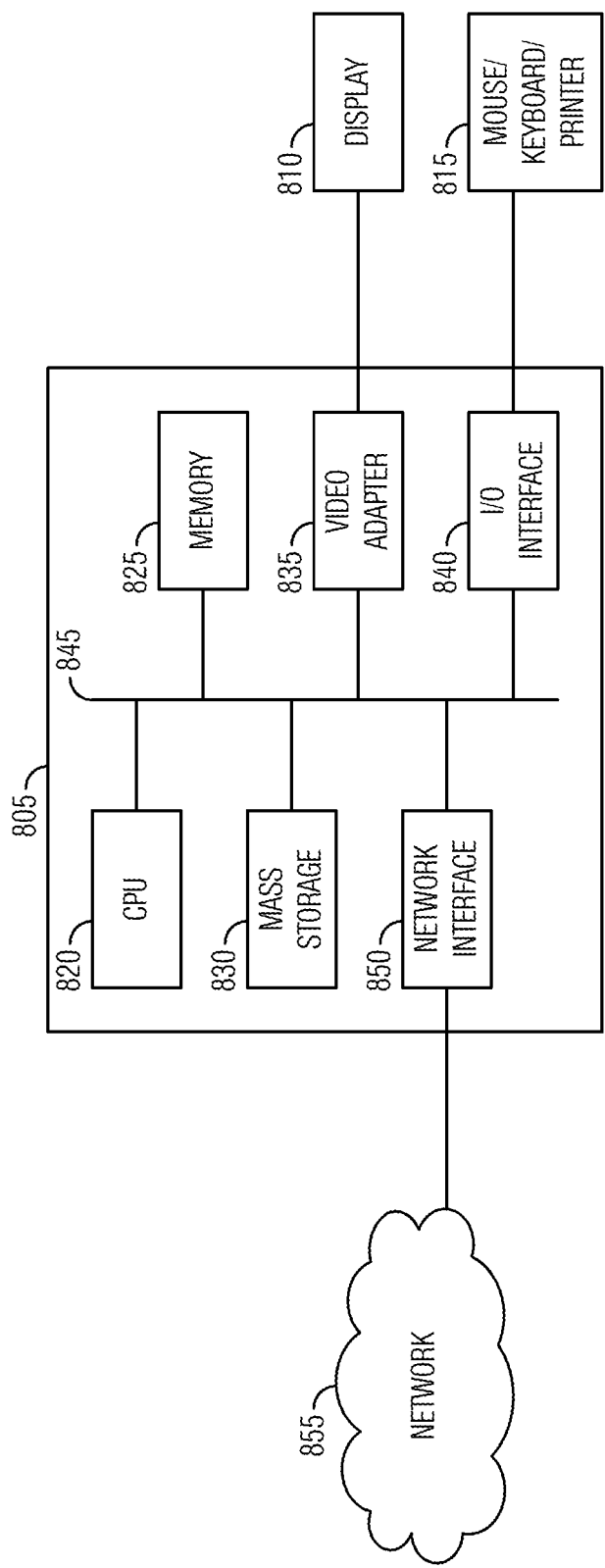
FIG. 8 is a block diagram of a processing system that may be used for implementing the devices and methods disclosed herein according to example embodiments described herein.

FIG. 8 is a block diagram of a processing system 800 that may be used for implementing the devices and methods disclosed herein. In some embodiments, the processing system 800 comprises a UE. In other embodiments, the processing system 800 comprises a network controller. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 815 (including speaker, microphone, mouse, touchscreen, keypad, keyboard, printer, and the like), display 810, and so on. The processing unit may include a central processing unit (CPU) 820, memory 825, a mass storage device 830, a video adapter 835, and an I/O interface 840 connected to a bus 845.

The bus 845 may be one or more of any type of several bus architectures including a memory bus or memory controller, a peripheral bus, video bus, or the like. The CPU 820 may comprise any type of electronic data processor. The memory 825 may comprise any type of system memory such as static random access memory (SRAM), dynamic random access memory (DRAM), synchronous DRAM (SDRAM), read-only memory (ROM), a combination thereof, or the like. In an embodiment, the memory 825 may include ROM for use at boot-up, and DRAM for program and data storage for use while executing programs.

The mass storage device 830 may comprise any type of storage device configured to store data, programs, and other information and to make the data, programs, and other information accessible via the bus 845. The mass storage device 830 may comprise, for example, one or more of a solid state drive, hard disk drive, a magnetic disk drive, an optical disk drive, or the like.

The video adapter 835 and the I/O interface 840 provide interfaces to couple external input and output devices to the processing unit 805. As illustrated, examples of input and output devices include the display 810 coupled to the video adapter 835 and the mouse/keyboard/printer 815 coupled to the I/O interface 840. Other devices may be coupled to the processing unit 805, and additional or fewer interface devices may be utilized. For example, a serial interface such as Universal Serial Bus (USB) (not shown) may be used to provide an interface for a printer.

The processing unit 805 also includes one or more network interfaces 850, which may comprise wired links, such as an Ethernet cable or the like, and/or wireless links to access nodes or different networks 855. The network interface 850 allows the processing unit 805 to communicate with remote units via the networks 855. For example, the network interface 850 may provide wireless communication via one or more transmitters/transmit antennas and one or more receivers/receive antennas. In an embodiment, the processing unit 805 is coupled to a local-area network or a wide-area network 855 for data processing and communications with remote devices, such as other processing units, the Internet, remote storage facilities, or the like.

Figure 9:
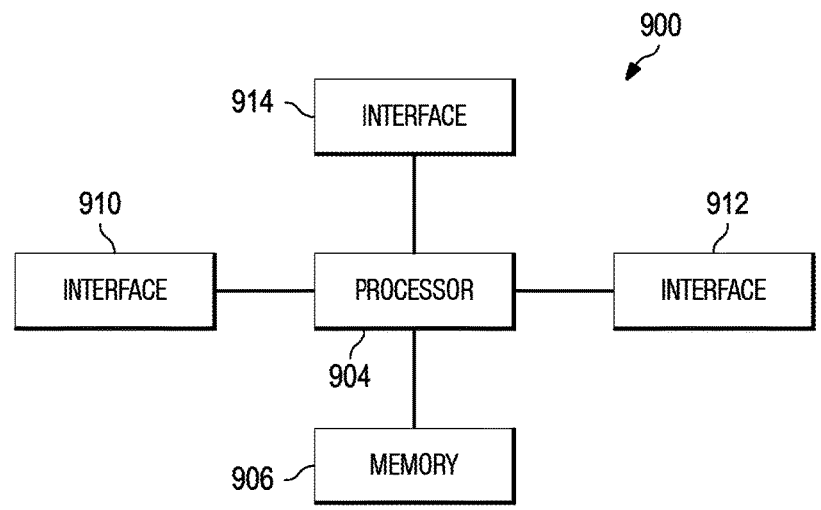
FIG. 9 illustrates a block diagram of an embodiment processing system for performing methods described herein.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
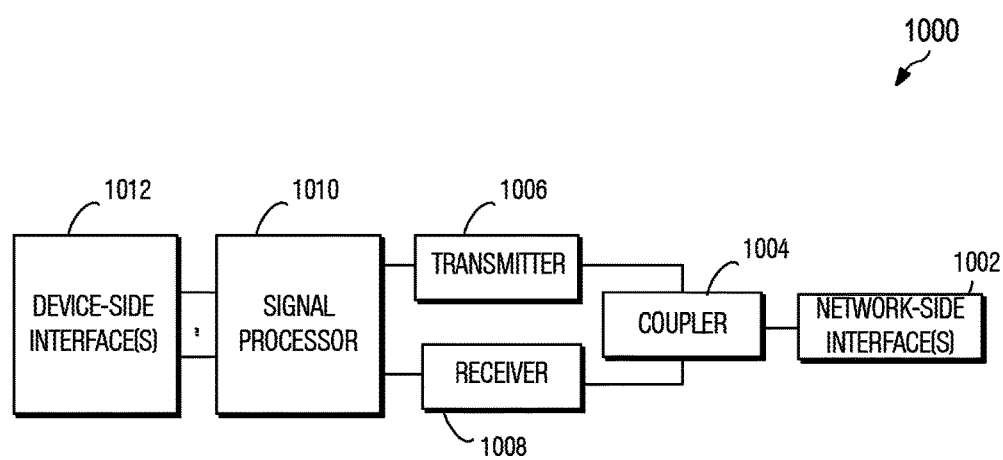
FIG. 10 illustrates a block diagram of a transceiver adapted to transmit and receive signaling over a telecommunications network according to example embodiments described herein.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for allocating resources of component carriers to a user equipment (UE), the method comprising:
    configuring, by a communications controller, a first group of component carriers with resource allocations indicated by a single joint downlink control information (DCI) message;
    configuring, by the communications controller, a second group of component carriers with resource allocations for each component carrier indicated by a dedicated DCI message;
    generating, by the communications controller, the single joint DCI message indicating first resource allocations for a first subset comprising a plurality of component carriers of the first group of component carriers;
    generating, by the communications controller, one or more dedicated DCI messages, each dedicated DCI message indicating a second resource allocation for a component carrier in a second subset of the second group of component carriers;
    mapping, by the communications controller, each one of the single joint DCI message and the one or more dedicated DCI messages to a respective control channel, each of the single joint and dedicated DCI messages being separate messages from each other; and
    sending, by the communications controller, the control channels to the UE.

2. The method of claim 1, wherein the first resource allocations comprises at least one resource in each component carrier of the first subset of the first group of component carriers.

3. The method of claim 2, wherein the single joint DCI message comprises at least one of a first field conveying a modulation coding scheme, or a second field conveying parameters for a hybrid automatic repeat request (HARQ) process, and wherein information conveyed in the first and second fields are applied to the first resource allocations.

4. The method of claim 3, wherein the parameters for the HARQ process include at least one of a new data indicator, a HARQ process number, or a redundancy version.

5. The method of claim 2, wherein the single joint DCI message comprises a scheduling information for each one of the at least one resource in each component carrier of the first subset of the first group of component carriers, and wherein the scheduling information conveys at least one of a modulation coding scheme, or parameters for a HARQ process.

6. The method of claim 1, wherein the control channels comprise at least one of a physical downlink control channel (PDCCH) or an enhanced physical downlink control channel (EPDCCH).

7. The method of claim 1, wherein the single joint DCI message further comprises an indicator indicating the first subset of the first group of component carriers.

8. The method of claim 1, wherein the first group of component carriers comprises at least one component carrier located in an unlicensed band.

9. The method of claim 1, wherein the first resource allocations comprise resources allocated at a component carrier granularity.

10. The method of claim 9, wherein a transport block spans at least one component carrier.

11. The method of claim 1, wherein the configuring the first group of component carriers is in accordance with higher layer signaling.

12. A method for determining allocated resources of component carriers, the method comprising:
    receiving, by a user equipment (UE), a component carrier configuration indicating a first group of component carriers and a second group of component carriers;
    receiving, by the UE, a single joint downlink control information (DCI) message and one or more dedicated DCI messages, each DCI message on a respective control channel, each of the single joint and dedicated DCI messages being separate messages from each other, the single joint DCI message indicating first resource allocations for a first subset comprising a plurality of component carriers of the first group of component carriers, and each dedicated DCI message indicating a second resource allocation for a component carrier in a second subset of the second group of component carriers; and
    communicating, by the UE, data in accordance with the resource allocations of the first subset and the second subset.

13. The method of claim 12, wherein communicating the data comprises:
    searching, by the UE, the received control channels for the single joint DCI message indicating the first resource allocations of the first subset;
    identifying, by the UE, the component carriers of the first subset in accordance with the single joint DCI message;
    searching, by the UE, the received control channels for the one or more dedicated DCI messages;
    identifying, by the UE, the component carriers of the second subset in accordance with the one or more dedicated DCI messages; and
    communicating, by the UE, the data in accordance with the identified component carriers of the first subset and the identified component carriers of the second subset.

14. The method of claim 13, wherein identifying the component carriers of the first subset comprises identifying the component carriers of the first subset in accordance with one of a component carrier list carried in the single joint DCI message, a component carrier bitmap carried in the single joint DCI message, or the resource allocations of the first group of component carriers as indicated in the component carrier configuration.

15. A communications controller adapted to allocate component carriers to a user equipment (UE), the communications controller comprising:
    a processor; and
    a computer readable storage medium storing programming for execution by the processor, the programming including instructions to configure the communications controller to:
        configure a first group of component carriers with resource allocations indicated by a single joint downlink control information (DCI) message,
        configure a second group of component carriers with resource allocations for each component carrier indicated by a dedicated DCI message,
        generate the single joint DCI message indicating first resource allocations for a first subset comprising a plurality of component carriers of the first group of component carriers,
        generate one or more dedicated DCI messages, wherein each dedicated DCI message indicates a second resource allocation for a component carrier in a second subset of the second group of component carriers, map each one of the single joint DCI message and the one or more dedicated DCI messages to a respective control channel, each of the single joint and dedicated DCI messages being separate messages from each other; and send the control channels to the UE.

16. The communications controller of claim 15, wherein the first resource allocations comprises at least one resource in each component carrier of the first subset of the first group of component carriers.

17. The communications controller of claim 16, wherein the single joint DCI message comprises at least one of a first field conveying a modulation coding scheme, or a second field conveying parameters for a hybrid automatic repeat request (HARQ) process, and wherein information conveyed in the first and second fields are applied to the first resource allocations.

18. The communications controller of claim 15, wherein the control channels comprise at least one of a physical downlink control channel (PDCCH) or an enhanced physical downlink control channel (EPDCCH).

19. The communications controller of claim 15, wherein the programming includes instructions to configure the first group of component carriers in accordance with higher layer signaling.

20. A user equipment (UE) adapted to determine allocated network resources, the UE comprising:

a processor; and a computer readable storage medium storing programming for execution by the processor, the programming including instructions to configure the UE to:

receive a component carrier configuration indicating a first group of component carriers and a second group of component carriers, receive a single joint downlink control information (DCI) message and one or more dedicated DCI messages, each DCI message on a respective control channel, each of the single joint and dedicated DCI messages being separate messages from each other, the single joint DCI message indicating first resource allocations for a first subset comprising a plurality of component carriers of the first group of component carriers, and each dedicated DCI message indicating a second resource allocation for a component carrier in a second subset of the second group of component carriers, and communicate data in accordance with the resource allocations of the first subset and the second subset.

21. The UE of claim 20, wherein the programming includes instructions to:

search the received control channels for the single joint DCI message indicating the first resource allocations of the first subset, identify the component carriers of the first subset in accordance with the single joint DCI message, search the received control channels for the one or more dedicated DCI messages, identify the component carriers of the second subset in accordance with the one or more dedicated DCI messages, and communicate the data in accordance with the identified component carriers of the first subset and the identified component carriers of the second subset.

22. The UE of claim 20, wherein the programming includes instructions to identify the component carriers of the first subset in accordance with one of a component carrier list carried in the single joint DCI message, a component carrier bitmap carried in the single joint DCI message, or the resource allocations of the first group of component carriers as indicated in the component carrier configuration.

* * * * *